July 22, 1947.  H. D. SMITH  2,424,258
ARTICLE-INVERTING APPARATUS
Filed Sept. 19, 1944
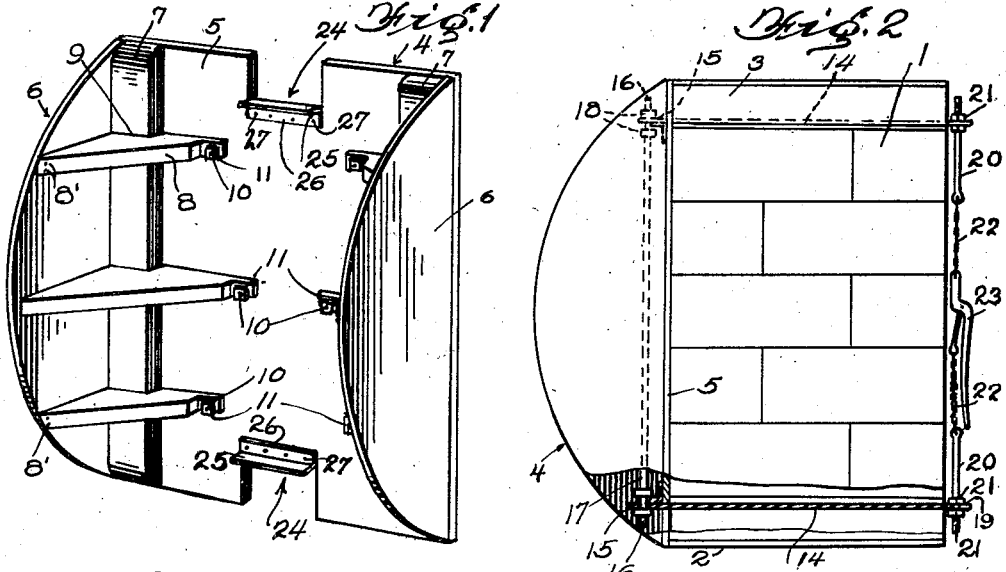
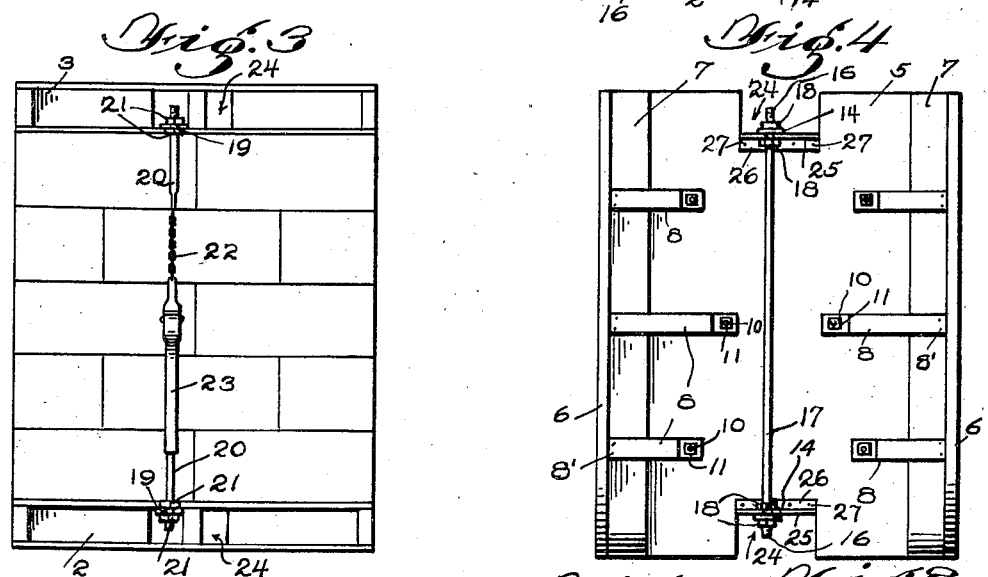
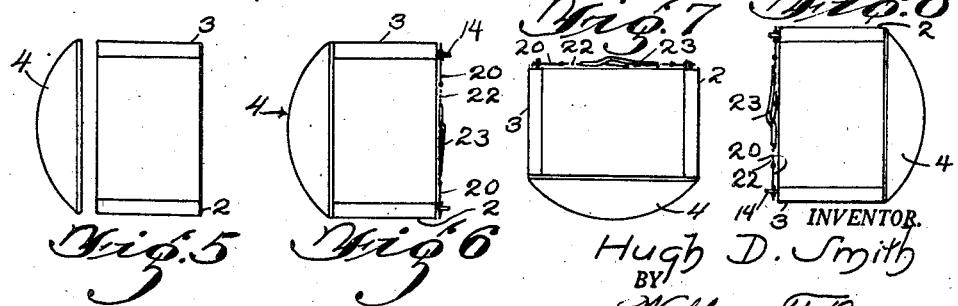
INVENTOR.
Hugh D. Smith
BY William F. Desmond
ATTORNEY Patented July 22, 1947

2,424,258

UNITED STATES PATENT OFFICE 2,424,258

ARTICLE-INVERTING APPARATUS

Hugh Doud Smith, United States Army,
Richmond, Va.

Application September 19, 1944, Serial No. 554,831

3 Claims. (Cl. 259—54)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

This invention relates to a method and apparatus for handling and turning packing cases.

It is an object of the invention to provide a method and apparatus for rocking articles of merchandise in order to invert them.

Another object of the invention is to provide a method and apparatus for turning a plurality of packing cases containing bottles, jars, boxes or cans; the contents of which require periodical turning.

Another object of the invention is to provide a method and apparatus adapted to be used particularly in warehouses for inverting a plurality of cases packed with food such as evaporated milk.

A further object of the invention is to provide a method and apparatus for agitating the contents of a plurality of packing cases held between upper and lower pallets.

A still further obpect of the invention is to provide an apparatus for inverting a plurality of packed cases which is of extremely simple and economical construction and which may be readily operated.

Referring to the drawings:

Figure 1 is a perspective view of the turning cradle.

Figure 2 is a side elevational view of the turning device connected to a pallet load, being partly broken away at the lower portion.

Figure 3 is a rear elevational view of the turning device connected to a pallet load.

Figure 4 is a front elevational view of the turning device connected to a pallet load.

Figure 5 is a diagrammatic view of the turning device in position to be attached to the pallet load.

Figure 6 is a diagrammatic view of a pallet load with the turning device attached in position to be turned.

Figure 7 is a diagrammatic view of a pallet load with the turning device attached and contacting the supporting surface.

Figure 8 is a diagrammatic view of the device shown in Figure 5 after it has been attached to the pallet load and the pallet load inverted.

In the storage of evaporated milk, particularly in warehouses, it has been found necessary in order to preserve the milk that it be periodically turned at least every sixty days, the reason for this being that evaporated milk consists of approximately 76% water and 24% solid matter. If the containers which hold the milk and which are usually in the form of cans are not turned at least every 60 days so as to agitate the milk, the solid matter tends to settle to the bottom of the container, the result being that the milk not only loses its flavor but is apt to spoil.

The practice customarily followed in warehouses for agitating cases packed with evaporated milk is to periodically invert the individually packed cases by hand. As a result, a great deal of time and labor is consumed, particularly in Government depots where large quantities of evaporated milk are stored for the armed forces.

Referring to Figure 1, the apparatus for turning or inverting the loaded pallet comprises a cradle 4 consisting of a base or body member 5 provided with runners or rockers 6, preferably arcuate in shape. Various other shaped rockers or runners may be used, however, without departing from the spirit of the present invention.

In order to add rigidity to the cradle and at the same time provide an additional surface to which the runners may be attached, braces 7, positioned longitudinally of the body member 5 are provided. Braces 8, preferably extending transversely of the longitudinal members 7, may be notched or recessed at 9 so as to firmly engage and thereby make a tight fit with the members 7. One end of the braces 8 may be connected to the runners 6 by any suitable fastening means 8'. The other end of the braces are preferably connected to the back or body member 5 by means of bolts 10 and nuts 11. By having the braces 7 extend to substantially the upper edge of the runners 6, considerable strain is taken off the runners at their outer portion where they are subjected to the hardest use.

The cradle 4 is firmly attached to the pallet load by means of a clamping device. The clamping device comprises plates or arms 14 having one of their ends recessed at 15 and adapted to receive and hold the threaded portions 16 of a supporting member 17 by means of nuts 18. It will thus be seen that the rod 17 is connected to one end of the arms or plates 14. The other ends of the members 14 are bifurcated at 19 so as to receive a rod or like member 20 connected to the bifurcated portions 19 by means of nuts or the like 21. Chains 22 having one of their ends connected to the rods 20 and the other end connected to a conventional fastening member, preferably a pivoted clamp 23, are used in order to form an adjustable connection between the rods 20 and the clamp 23.

Referring to Figure 2, in practicing the present invention a plurality of cases 1 packed with containers of food which require periodical turning such as evaporated milk are stacked upon a pallet 2 of the type customarily used in warehouses. Another pallet 3, preferably identical in construction with the pallet 2, is placed upon the top side of the uppermost case. The arms 14 of the clamping device are inserted through the recesses 24, which are formed in substantially the center of the top and bottom of the member 5 and are in more or less alignment. The arms 14 are then passed through the ends of the upper and lower pallets until the supporting member 17 contacts the flanges or spacing members 25 of the plates 26 which are secured to the body 5 by any suitable fastening means 27. The clamp 23 is then locked in position and thus draws and holds the upper pallet 3 to the lower pallet 2 and at the same time firmly holds the cradle or turning device to the pallet load.

The purpose of the flanges 25 which are preferably of metal, are to space or hold the supporting member 17 from contacting with the base or body member 5 when the clamp is in locked position. As a result of the supporting member 17 being out of contact with the body member 5, little or no strain is put upon the body member when the clamp or fastening member 23 is in locked position.

After the clamp is secured to the pallet load, it is merely necessary to rotate or turn the pallet load upon the rocker 6 until the load is inverted and the original bottom or supporting pallet becomes the top pallet of the load and the original top pallet becomes the bottom or supporting pallet for the load. By referring to Figures 5-8, it will be seen that by this procedure, the packing cases have been turned 180° and as a result the containers in the packing cases have been agitated.

While I have shown and described a simple and preferred form of carrying my invention into practice, it is to be understood that various changes in the size, shape, and arrangement of parts may be resorted to without departing from the spirit of the invention or the scope of the appended claims.

I claim:

1. In an apparatus for inverting one or more articles assembled into a stack with topwise and bottomwise placed pallets having passages extending lengthwise therethrough: a cradle comprising a base, spaced rockers extending perpendicularly from said base, a pair of parallel edges in said base normal to said rockers, each of said edges being recessed for the reception of releasable fastening means adapted to pass through and beyond said passages in said pallets and to encircle said stack.

2. In an apparatus for inverting one or more articles assembled into a stack with topwise and bottomwise placed pallets having passages extending lengthwise therethrough: a cradle comprising a base, spaced rockers extending perpendicularly from said base, a pair of parallel edges in said base normal to said rockers, each of said edges having a recessed portion for the reception of releasable fastening means adapted to pass through and beyond said passages in said pallets and to encircle said stack, and a pair of spaced flanges reinforcing said recessed portions and extending therefrom in the same direction as said rockers as bearing surfaces for said fastening means.

3. Apparatus for inverting one or more articles assembled into a stack with topwise and bottomwise placed pallets having passages extending lengthwise therethrough, said apparatus comprising in combination: a cradle having a base, spaced rockers extending perpendicularly from said base, said base having two parallel edges normal to said rockers, each of said edges having a recessed portion, and releasable fastening means for encirclingly securing said stack to said base, said fastening means including parallel arms extending through and beyond said recessed portions of said base and having free ends insertable through said pallet passages to extend beyond said pallets.

HUGH DOUD SMITH.

REFERENCES CITED

The following references are of record in the file of this patent:

UNITED STATES PATENTS

| Number | Name | Date |
| --- | --- | --- |
| 382,639 | Doty | May 8, 1888 |
| 713,065 | Coon et al. | Nov. 11, 1902 |
| 1,729,507 | Dunn | Sept. 24, 1929 |
| 1,429,327 | Daniell | Sept. 19, 1922 |
| 1,487,669 | Shiffner | Mar. 18, 1924 |
| 1,609,776 | Shwenk | Dec. 7, 1926 |
| 1,967,683 | Ostrander | July 24, 1934 |
| 2,116,381 | Burke | May 3, 1938 |